L. FERRY & F. DI GIOIA.
PLOW.
APPLICATION FILED JUNE 29, 1908.
902,284.
Patented Oct. 27, 1908.
2 SHEETS—SHEET 2.
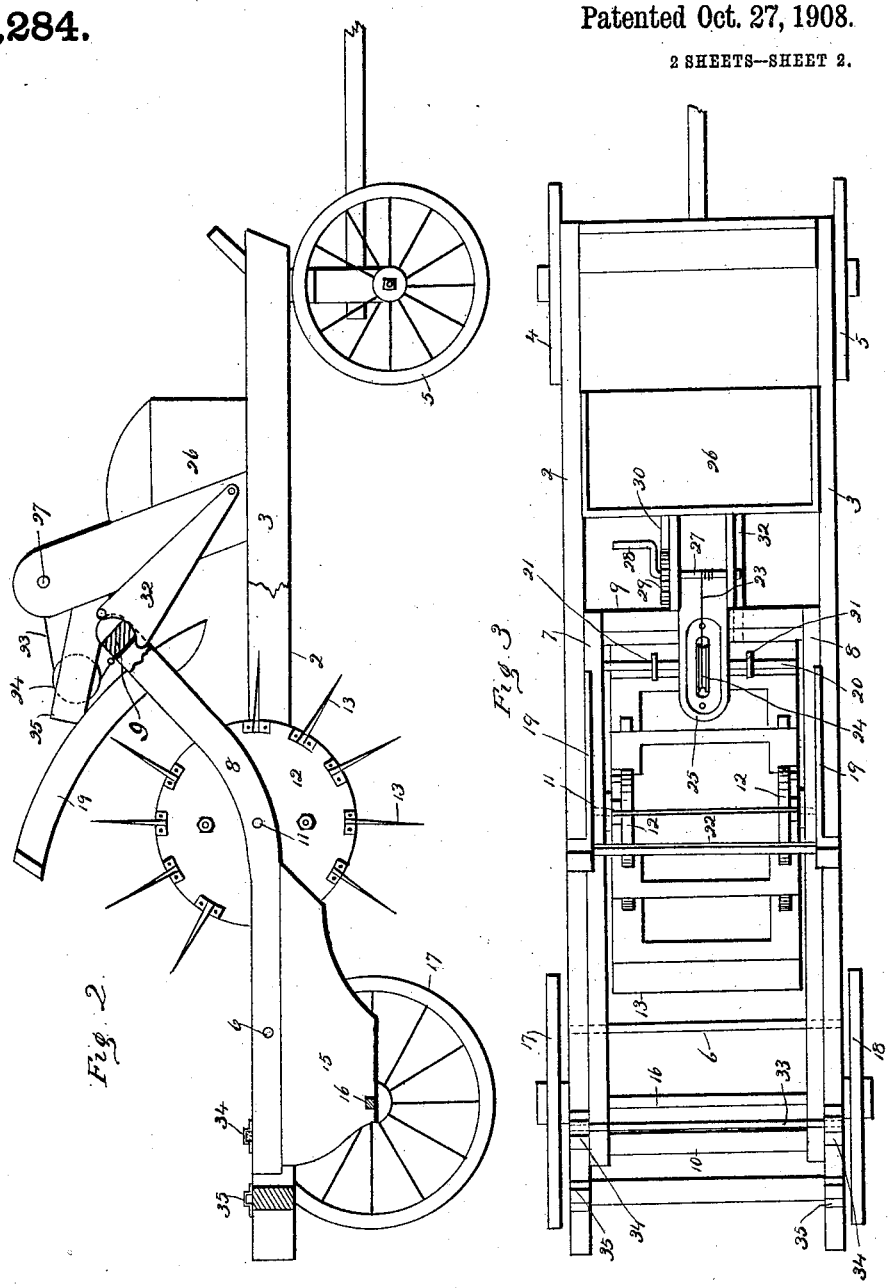

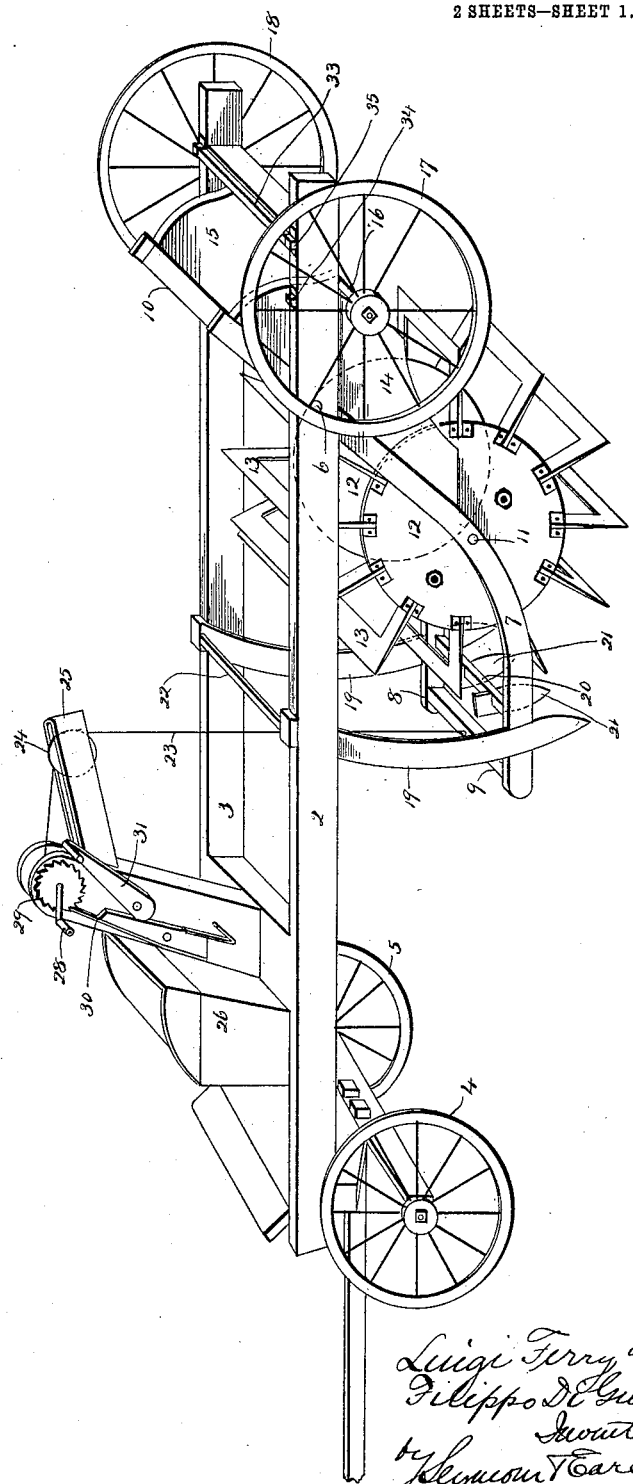

UNITED STATES PATENT OFFICE.

LUIGI FERRY AND FILIPPO DI GIOIA, OF DERBY, CONNECTICUT.

PLOW.

No. 902,284.  Specification of Letters Patent.  Patented Oct. 27, 1908.

Application filed June 29, 1908. Serial No. 441,049.

*To all whom it may concern:*

Be it known that we, LUIGI FERRY and FILIPPO DI GIOIA, subjects of the King of Italy, and residing at Derby, in the county of New Haven and State of Connecticut, have invented a new and useful Improvement in Plows; and we do hereby declare the following, when taken in connection with the accompanying drawings and the letters of reference marked thereon, to be a full, clear, and exact description of the same, and which said drawings constitute part of this specification, and represent, in—

Figure 1 a perspective view of a plow constructed in accordance with our invention and shown in an operative position. Fig. 2 a side view with one of the bars broken away and the cutters and blades shown in a raised position. Fig. 3 a top or plan view of the plow.

This invention relates to an improvement in plows and particularly to plows adapted for cutting up turf land, the object of the invention being a simple arrangement of cutters whereby the turf is cut in small pieces preparatory to plowing in the usual manner; and the invention consists in the construction and combination of parts as hereinafter described and particularly recited in the claims.

In carrying out our invention we employ a frame comprising side bars 2, 3, connected together at their forward ends and mounted upon forward wheels 4, 5, in the usual manner. The side bars 2, 3, near their rear ends are connected together by a transverse bar 6 and on this bar is mounted a cutter frame composed of rocking arms 7, 8, connected together by a lifting bar 9 and at the rear by braces 10. Between these rocking arms and supported thereby is a shaft 11 on which is mounted disks 12 which support a series of transverse blades 13. Secured to the rocking arms 7, 8, at the rear end and projecting downward therefrom are wheel supports 14, 15, which are connected with the rear axle 16 of the rear wheels 17 and 18. To each of the rocking arms near their forward ends is a cutter 19 and mounted on a cutter bar 20 between the rocking arms are a series of cutter points 21 in line with and corresponding to the points of the cutters 19. The cutters 19 are bowed and extend upward above the side bars 2, 3, of the frame, and are connected by a stay 22 which rests upon the upper edges of the side bars 2, 3, so as to limit the downward movement of the cutters. As a convenient means for raising the rocking arms and the blades and cutters so as to clear the ground when the plow is not in use, we connect a cord or chain 23 with the lifting bar 9 and extend this cord or chain over a pulley 24 mounted in the rearwardly extending arm 25 supported by the seat frame 26. From the pulley the cord extends to a spindle 27 also supported by the seat frame and adapted to be turned by the crank 28. On the spindle at one side is a ratchet wheel 29 adapted to be engaged by the pawl 30 so as to hold the spindle against rotation and to throw the pawl out of engagement with the ratchet and so as to release the blades and cutters, we provide a pawl cam 31 pivoted adjacent to the pawl and adapted when turned to throw the pawl out of engagement with the ratchet. On the opposite side of the support is a locking dog 32 adapted to be turned beneath the lifting arm 9 when the same is lifted to its raised position as shown in Fig. 2 of the drawings. Thus the frame is not only held by the pawl but also by the locking dog. As a still further means for locking the frame in its raised position we provide a bar 33 which, when the plow is raised, is inserted beneath the loops 34 secured to the side bars of the frame in rear of the shaft 6 so that the rear ends of the rocking arms 7 and 8 would bear against it. When the blades and cutters are to be dropped this is removed and may be inserted beneath loops 35 as shown in Fig. 1 of the drawings, or otherwise stored for convenience.

In Fig. 1 of the drawings we have shown the device ready for use, the rocking arms having been dropped so as to allow the cutters 19 and 21 to enter the ground as well as the edges of the blades 13. The cutters 19 and 21 make longitudinal cuts, while the blades 13 cut transversely thereto, so that a portion is cut into very small pieces.

When not in use and for transportation, the chain or suspending device 23 is wound upon the drum which lifts the rocking arms so that the blades clear the surface of the ground, and when lifted is held in its raised position by the dog 32 and by the bar 33.

We claim:—

1. A plow comprising a frame, rocking arms mounted between the frame, transverse blades mounted between said arms, vertical cutters connected with said rocking arms in advance of said blades, and means connected with said rocking arms for raising their forward ends whereby the blades and cutters are lifted above the surface of the ground, substantially as described.

2. A plow comprising a frame having side bars, the forward wheels connected therewith, rocking arms mounted between the sides of the frame near the rear ends thereof, a shaft through said arms, disks mounted thereon, said disks supporting transverse blades, vertical cutters connected with the forward end of said rocking arms, a winding spindle mounted at the forward end of the frame, and connection between said spindle and rocking arms, whereby the forward ends of the rocking arms may be raised, substantially as described.

3. A plow comprising a frame having side bars, a seat supported at the forward end thereof, and the forward end mounted upon the wheels, rocking arms mounted between said side bars, wheel supports at the rear end of said rocking arms and wheels connected therewith, a shaft mounted in said rocking arms, disks mounted thereon, transverse blades connected with said disks, cutters connected with the forward ends of said arms, a winding spindle mounted on said seat support and connection between said spindle and rocking arms whereby the forward ends of the rocking arms may be raised.

In testimony whereof, we have signed this specification in the presence of two subscribing witnesses.

LUIGI FERRY.
FILIPPO DI GIOIA.

Witnesses:
LUIGI SCARPA,
PETER POSSERO.